Patented Dec. 16, 1947

2,432,686

UNITED STATES PATENT OFFICE 2,432,686

MANUFACTURE OF RESINS FROM SULFUR DIOXIDE AND UNSATURATED ORGANIC COMPOUNDS

Allison K. Scribner and Frank W. Wilder, Portsmouth, Va., assignors, by mesne assignments, to Phillips Petroleum Company, a corporation of Delaware No Drawing. Application August 23, 1943, Serial No. 499,712

2 Claims. (Cl. 260—94.5)

This invention relates to the reaction of sulfur dioxide with unsaturated organic compounds to form high molecular weight heteropolymers thereof. In one of its more specific aspects the invention relates to the reaction of sulfur dioxide with a mixture of olefins to form such heteropolymers.

The reaction of sulfur dioxide with unsaturated organic compounds to produce high molecular weight resinous heteropolymers which can be molded under heat and pressure or used in other ways to produce useful articles of commerce has been quite widely described in the patent and non-patent literature. Fitch and Frey, in Patent No. 2,128,032, dated September 6, 1938, describe conducting the reaction in the presence of catalysts. Frey and Snow in Patent No. 2,112,986, dated April 5, 1938, describe reacting sulfur dioxide with mixtures of two or more unsaturated organic compounds to produce resinous products of desired characteristics.

An object of this invention is to produce polymers of sulfur dioxide and a mixture of olefins, particularly propylene, butene-1 and butene-2, which are clear and transparent.

A further object of this invention is to control the reaction conditions in such manner that a product of uniformly satisfactory characteristics may be obtained.

Resins which are very satisfactory from the standpoint of clarity and molding characteristics can be obtained by reacting a mixture comprising 50 per cent by weight propylene, 33 per cent by weight butene-2 and 17 per cent by weight of butene-1 with an excess of sulfur dioxide. We have discovered, however, that in reacting such a mixture of sulfur dioxide and olefins care must be taken to maintain the reaction temperature within certain prescribed limits in order that clear and transparent resins of good molding characteristics may be obtained. We have found reaction temperatures within the range of approximately 95° F. to 115° F. to be satisfactory.

The reaction is faintly exothermic and hence maintenance of the reaction temperature generally will involve cooling of the reactor although under certain conditions the normal heat loss from the reactor may be greater than that generated by the reaction, in which case, obviously, heat must be applied.

It is not known why resins produced at a reaction temperature above or below that set forth above are less satisfactory, but we have found that resins produced at temperatures above the range herein specified are mottled in appearance and resins produced at a reaction temperature below the range specified have a hazy, more or less opaque and non-transparent appearance, whereas resins produced at temperatures within the range specified are clear and transparent and practically colorless.

The following examples, inserted for the purpose of illustration, show by contrast the effect of operating above, below and within the preferred range.

Example I 115 pounds of sulfur dioxide, 2.81 pounds of propylene, 1.87 pounds of butene-2, 0.94 pound of butene-1 were charged to a reactor together with 325 cc. of a 5 per cent solution of lithium nitrate in absolute ethanol as the catalyst. The reactor was provided with a water jacket, through which a heating or cooling medium was supplied as necessary. The sulfur dioxide was charged first, followed by the olefins and catalyst. The temperature was brought rapidly to approximately 107° F. and maintained within the preferred range for a considerable portion of the reaction time. After precipitation of the resin as a fine powder, by discharging the reactor contents into a vessel of water saturated with sulfur dioxide, and washing and drying the resulting precipitate, clear and transparent moldings were obtained.

Example II

In contrast to the above operations set forth in Example I, conducted under preferred conditions, the same materials in the same proportions were charged to the reactor and the temperature was brought rapidly to approximately 118° F. and was held above the preferred range for a considerable portion of the reaction time. After obtaining molding powder in the manner described above in Example I, molded specimens obtained under the same molding conditions as in Example I contained a great number of white flocs of a millimeter or so in diameter and so numerous as to render the specimen substantially non-transparent, in contrast to the clear and transparent specimen of Example I.

Example III

In contrast to the above operation set forth in Example I, conducted under preferred conditions, the same materials in the same proportions were charged to the reactor and the temperature was held below 90° F. for the major portion of the reaction cycle. After obtaining a molding powder in the manner described in Example I, molded specimens obtained under the same conditions as in Example I appeared almost homogeneous, containing only a few visible particles, but exhibited a hazy, more or less opaque and non-transparent appearance in contrast to the clear and transparent specimen of Example I.

Although our invention has been described in connection with an olefin-sulfur dioxide resin in which the olefins were present in the olefin reactants in the ratio of 50 weight per cent propylene, 33 weight per cent butene-2 and 17 weight per cent butene-1, it is to be understood that our invention can be applied to resins of the general type in which the proportion of the olefin reactants vary considerably from the above ratios. We have applied our invention to the reaction of sulfur dioxide with proylene, butene-2 and butene-1 within the following proportions by weight: propylene, 42% to 58%; butene-2, 28% to 39%; butene-1, 14% to 19%.

Having thus described our invention, we claim:

1. In a process for reacting sulfur dioxide with a mixture of olefins comprising popylene, butene-1 and butene-2 to form high molecular weight polymers thereof, that improvement which comprises conducting the reaction with a mixture of olefins containing from 42 to 58 weight per cent propylene, 28 to 39 weight per cent butene-2 and 14 to 19 weight per cent butene-1 with sulfur dioxide at a temperature within the range of from 95° F. to 115° F.

2. In a process for reacting sulfur dioxide with a mixture of olefins comprising propylene, butene-1 and butene-2 to form high molecular weight polymers thereof, that improvement which comprises conducting the reaction with a mixture of olefins containing about 50 weight per cent propylene, 33 weight per cent butene-2 and 17 weight per cent butene-1 with sulfur dioxide at a temperature within the range of from 95° to 115° F.

ALLISON K. SCRIBNER.
FRANK W. WILDER.

REFERENCES CITED

The following references are of record in the file of this patent:

UNITED STATES PATENTS

| Number | Name | Date |
| --- | --- | --- |
| 1,196,259 | Matthews | Aug. 29, 1916 |
| 2,112,986 | Frey | Apr. 5, 1938 |
| 2,280,818 | Frey | Apr. 28, 1942 |

FOREIGN PATENTS

| Number | Country | Date |
| --- | --- | --- |
| 528,051 | Great Britain | Oct. 22, 1940 |